United States Patent [19]

Zlotek

[11] 3,772,760
[45] Nov. 20, 1973

[54] METHOD OF BINDING THE SYNTHETIC RESINOUS WALL OF AN OPENING TO A METAL INSERT

[75] Inventor: Rudolf Zlotek, Mutters b/Innsbruck, Austria

[73] Assignee: Willi Seeber, Kardaun (Bozen), Italy

[22] Filed: Nov. 5, 1971

[21] Appl. No.: 196,131

[30] Foreign Application Priority Data
Nov. 9, 1970 Germany.................. P 20 55 018.9

[52] U.S. Cl.................... 29/400, 29/470.3, 29/511, 156/73, 220/86
[51] Int. Cl... B23p 17/00, B23k 27/00, B23p 11/00
[58] Field of Search...................... 29/400 D, 470.3, 29/451, 400 R, 511; 156/73; 220/86

[56] References Cited
UNITED STATES PATENTS
3,002,871  10/1961  Tramm et al. ........................ 156/73
3,161,330  12/1964  Sagarin et al. ...................... 29/470.3
3,184,353   5/1965  Balamuth et al. .................... 156/73
3,293,738  12/1966  Caldwell et al. ...................... 29/451
3,695,651  10/1972  Stuck ........................ 29/149.5 B X Primary Examiner—Thomas H. Eager
Attorney—Richard K. Stevens et al.

[57] ABSTRACT

A method of connecting a thermoplastic synthetic resinous wall of an opening with a metal insert which involves placing the insert in the opening with one end thereof extending beyond the edge of the opening and bending the extended portion of the insert by a rolling or flanging operation to form a bead over the edge of the opening and to simultaneously develop sufficient frictional heat to fuse the resin and seal the insert to the wall around the opening.

2 Claims, 1 Drawing Figure

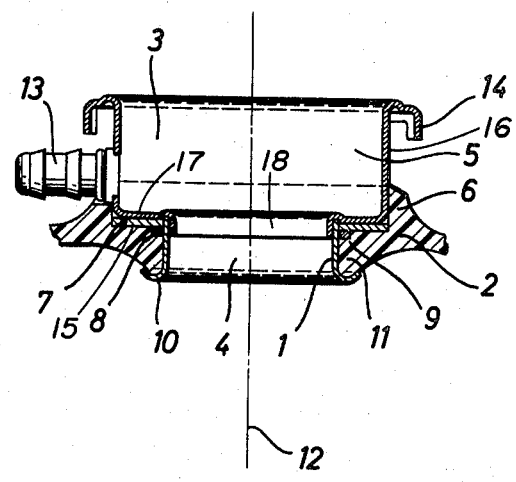

METHOD OF BINDING THE SYNTHETIC RESINOUS WALL OF AN OPENING TO A METAL INSERT

This invention relates generally to containers and more particularly to a filler neck for containers such as, for example, cooling water overflow or header tanks and fuel tanks for motor vehicles. The invention also relates to a method of producing a homogeneous connection between a component of thermoplastic synthetic resin or polyester and a metal component that surrounds it, especially between the wall of a container of thermoplastic synthetic resin or polyester and a filler neck of metal, to produce a filler neck assembly for the container.

Hitherto attempts to produce a tight and rigid connection between a metal part and an adjacent part of a thermoplastic synthetic resin have been unsuccessful. An object of the invention is to make this possible, particularly in filler necks for containers which also may be made of a polyester.

The objects of the invention are accomplished by providing a method for connecting the rim of an opening in a thermoplastic synthetic resinous container with a metallic tubular neck inserted in the opening wherein an end of the neck which protrudes from the opening above the edge thereof is flared outwardly over the edge and the heat developed by working the metal fuses the resin which sticks to the metal and connects the tube together. At least one sealing ring, preferably resilient, may be provided between the opening and the filler neck tube.

According to a further preferred feature of the invention the filler neck has a cup-shaped portion attached to a collar of reduced diameter that projects into the opening in the container wall. In this case the collar is preferably formed as a separate component and securely connected to the cup-shaped part of the filler neck tube, preferably hard-soldered. The cup-shaped part of the filler neck tube can overlie a sealing ring on the wall of the container, through which the collar extends. Additionally, or instead of this, the collar may be surrounded by an O-ring arranged in an annular groove in the wall of the container about the opening.

In a preferred embodiment of the invention, a rim or flange is provided around the mouth of the filler neck to provide means for closing the neck with a suitable cap. An annular bead is formed on the wall of the container to encircle an opening which combines with the bore of the collar attached to the cup-shaped upper portion of the filler neck to define the opening or entrance to the container.

A homogeneous connection is formed between the thermoplastic synthetic resinous or polyester container wall and the collar of the filler neck by bending the wall of the collar at its open edge to form an annular flange over the adjacent edge of the container wall and melt the surrounding thermoplastic synthetic resin or polyester with heat developed by bending the metal.

Referring now to the drawing, the embodiment of the invention illustrated therein is disposed in an opening 1 in thermoplastic resinous or polyester wall 2 of a container which may be a header tank, a fuel tank for an automobile or the like. Only that portion of the resinous container wall immediately adjacent the opening 1 is shown because the remainder of the container may be of any desirable configuration.

Opening 1 is surrounded adjacent the interior of the container by an edge 11 of the container wall 2. An external cylindrical mouth portion of greater diameter is surrounded by a head or rim 6 integral with the remainder of wall 2. The vertical inner surface of annular rim 6 and the vertical inner surface of edge 11 of wall 2 join with the horizontal flat surface of an intermediate shoulder 15 to form a step-like wall about opening 1.

Filler neck or tube 3 is a metallic insert in opening 1 of container 2. Filler neck 3 is composed of a cup-shaped exposed portion having a cylindrical wall 16 and a bottom 17 which enclose an opening 5. An opening in the bottom of the cup-shaped portion has an external depending annular rim 18 thereabout. A collar 4 is disposed about rim 18 with its wall hard-soldered or otherwise secured to the outer surface of rim 18. The external diameter of the cup-shaped member is substantially the same as the diameter of opening 1 between the inner surfaces of bead 6 so it fits snugly in the opening. Bottom 17 is disposed on shoulder 15 and the external diameter of rim 18 is somewhat less than that of opening 1 between the edges of the container wall 2 in order that the wall of collar 4 may be disposed therebetween. The upper end of wall 16 is rolled back upon itself to form annular U-shaped flange or rolled rim 14 about the mouth of the cup-shaped member. A suitable cap for closing opening 5 may be secured with a bayonet type connection to flange 14. A lateral connecting pipe 13 to be used for venting or other purposes is provided on wall 16.

A rubber sealing ring 7 is disposed about collar 4 and between bottom 14 and the surface of shoulder 15. A rubber O-ring 8 about collar 4 is compressed in an annular groove 9 in wall 2 between rubber ring 7 and collar 4.

The free edge 10 of collar 4 is flared outwardly about the edge 11 of wall 2 surrounding opening 1.

The sealing ring 7 and O-ring 8 are compressed by the forces in the direction of the longitudinal axis 12 produced by the flanging or beading over of the edge 10 of collar 4 to form a seal in the plane of the annular step between the collar 4 and the bottom of the cup-shaped member.

The connection of neck 3 and collar 4 to wall 2 is resilient so that no loosening of these components from each other occurs with variations in temperature. Likewise, sealing failures are avoided.

Neck 3 is attached to container wall 2 of thermoplastic synthetic resin or a polyester by first placing sealing ring 7 and the O-ring 8 about collar 4. Collar 4 is then inserted in opening 1 and its free edge 10 is mechanically flanged or beaded over the bead-like shaped edge 11 by means of a rolling or flanging device. The frictional heat developed during this operation fuses the thermoplastic synthetic resin or the polyester of wall 2 in the region of opening 1 which flows and seals collar 4 to the wall 2 around the opening 1. The resulting homogeneous connection does not change with the conditions arising in the container enclosed by wall 2 which may be subjected to pressures of up to about 2.5 atmospheres and temperatures of up to about 120° C.

The container walls may be any suitable thermoplastic resin which will fuse as the wall of collar 4 is flanged thereabout such as, for example, polyethylene, polyvinyl chloride or the like. The filler neck may be steel or any suitable alloy. The container walls may instead of this be of a suitable polyester which will fuse as the wall of collar 4 is flanged thereabout.

Although the invention has been described in detail for the purpose of illustration, it is to be understood that such detail is solely for that purpose and that variations can be made by those skilled in the art without departing from the spirit and scope of the invention except as it may be limited by the claims.

I claim:

1. A method of making a homogeneous connection between contacting surfaces of a thermoplastic synthetic resin about an opening and a metal insert in the opening which comprises
   a. disposing the metal insert in the opening with one end extending out of the opening, and
   b. flanging said end which extends out of the opening with a rolling or flanging device so that said end is beaded over the edge of the opening while simultaneously developing frictional heat and fusing the thermoplastic resin and causing it to flow and seal the insert to the wall around the opening.

2. The method of claim 1 wherein the synthetic resin is polyethylene, polyvinyl chloride or a polyester.

* * * * *